United States Patent
Yano et al.

(10) Patent No.: US 7,542,611 B2
(45) Date of Patent: Jun. 2, 2009

(54) IMAGE PROCESSING APPARATUS AND METHOD FOR CONVERTING FIRST CODE DATA SETS INTO SECOND CODE DATA FOR JPEG 2000 AND MOTION JPEG 2000

(75) Inventors: Takanori Yano, Kanagawa (JP); Minoru Fukuda, Kanagawa (JP); Keiichi Suzuki, Tokyo (JP); Yutaka Sano, Miyagi (JP); Tooru Suino, Kanagawa (JP); Yukio Kadowaki, Nara (JP); Shogo Oneda, Chiba (JP)

(73) Assignee: Ricoh Company, Ltd., Tokyo (JP)

( * ) Notice: Subject to any disclaimer, the term of this patent is extended or adjusted under 35 U.S.C. 154(b) by 868 days.

(21) Appl. No.: 10/726,852

(22) Filed: Dec. 2, 2003

(65) Prior Publication Data

US 2004/0163038 A1 Aug. 19, 2004

(51) Int. Cl.
*G06K 9/36* (2006.01)
*G06K 9/46* (2006.01)
(52) U.S. Cl. .................. 382/232; 382/235; 382/240
(58) Field of Classification Search ................ None
See application file for complete search history.

(56) References Cited

U.S. PATENT DOCUMENTS

| | | | | |
|---|---|---|---|---|
| 4,115,693 A | * | 9/1978 | McGrath | 250/363.02 |
| 5,218,672 A | * | 6/1993 | Morgan et al. | 345/501 |
| 5,764,807 A | * | 6/1998 | Pearlman et al. | 382/240 |
| 5,856,830 A | * | 1/1999 | Yamamoto | 345/474 |
| 6,081,278 A | * | 6/2000 | Chen | 345/473 |
| 6,512,793 B1 | * | 1/2003 | Maeda | 375/240.08 |
| 6,571,052 B1 | * | 5/2003 | Wakimoto et al. | 386/55 |
| 6,757,434 B2 | * | 6/2004 | Miled et al. | 382/236 |
| 6,785,423 B1 | * | 8/2004 | Joshi et al. | 382/235 |
| 6,873,343 B2 | * | 3/2005 | Chui | 345/667 |
| 7,142,722 B2 | * | 11/2006 | Fukuhara et al. | 382/240 |
| 2001/0028404 A1 | * | 10/2001 | Fukuhara et al. | 348/384.1 |
| 2002/0021843 A1 | * | 2/2002 | Fukuhara et al. | 382/235 |
| 2003/0118107 A1 | * | 6/2003 | Itakura et al. | 375/240.19 |

FOREIGN PATENT DOCUMENTS

| | | |
|---|---|---|
| JP | 2001-258031 | 9/2001 |
| JP | 2002-152500 | 5/2002 |

OTHER PUBLICATIONS

Section A.4.2 of ISO/IEC FCD15444-1:2000, JPEG 2000 Part I Final Committee Draft Verison 1.0, pp. 22-23.*

* cited by examiner

*Primary Examiner*—Matthew C Bella
*Assistant Examiner*—Yuzhen Ge
(74) *Attorney, Agent, or Firm*—Blakely, Sokoloff, Taylor & Zafman LLP

(57) ABSTRACT

In an image processing apparatus, first code data including multiple sets of code data in which image data of multiple static images are compressed and encoded, are synthesized. The first code data are converted into second code data that are compressed and encoded to be a single code data sequence where a motion image aligns the static images in chronological order as consecutive frames. In addition, the second code data may be converted into the first code data.

12 Claims, 19 Drawing Sheets

FIG.3
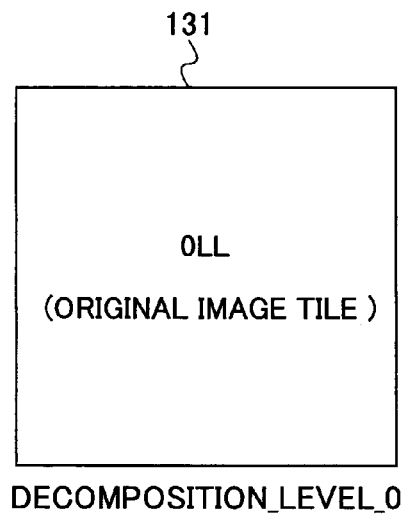
DECOMPOSITION_LEVEL_0
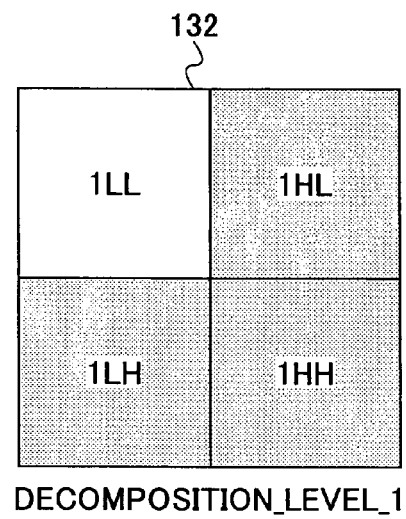
DECOMPOSITION_LEVEL_1
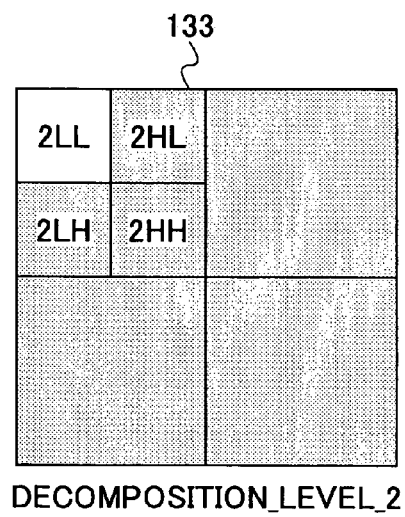
DECOMPOSITION_LEVEL_2
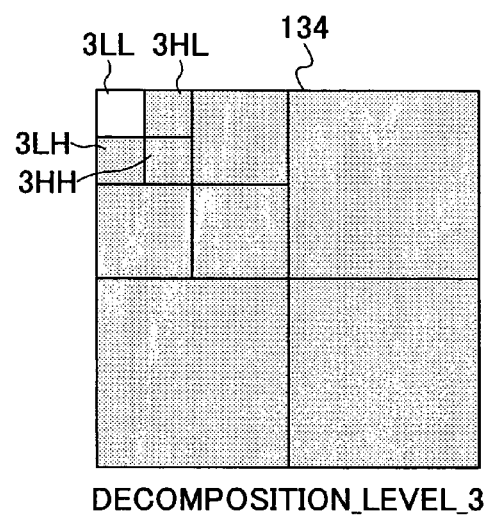
DECOMPOSITION_LEVEL_3

IMAGE PROCESSING APPARATUS AND METHOD FOR CONVERTING FIRST CODE DATA SETS INTO SECOND CODE DATA FOR JPEG 2000 AND MOTION JPEG 2000

The present application claims priority to the corresponding Japanese Application No. 2002-349791, filed on Dec. 2, 2002, the entire contents of which are hereby incorporated by reference.

BACKGROUND OF THE INVENTION

1. Field of the Invention

The present invention generally relates to an image processing apparatus, an imaging apparatus, and a program and a computer-readable recording medium thereof.

2. Description of the Related Art

Japanese Laid-Open Patent Application No. 2001-258031 discloses a technology of converting code data of a static image of JPEG 2000 into code data in accordance with Motion JPEG 2000.

Japanese Laid-Open Patent Application No. 2002-152500 discloses a technology of conducting a wavelet transform for each sheet of an original document by conducting a reduced layout on a single record sheet for an image of the original document including a plurality of sheets, generating a reduced image reducing by one half each sheet of the original document by using only components of LL2, HL2, LH2, and HH2, and printing out each reduced image in accordance with a predetermined layout.

SUMMARY OF THE INVENTION

An image processing apparatus, imaging apparatus, and program and computer-readable recording medium thereof are described. In one embodiment, the image processing apparatus comprises a first converting unit to synthesize first code data, including a plurality of code data sets where image data of a plurality of static images are compressed and encoded, and to convert the first code data into second code data which are compressed and encoded to be a single code data sequence where a motion image aligns the static images in chronological order as consecutive frames. The image processing apparatus further comprises a second converting unit to convert the second code data into the first code data.

BRIEF DESCRIPTION OF THE DRAWINGS

In the following, embodiments of the present invention will be described with reference to the accompanying drawings.

FIG. 3 is a diagram showing sub bands of each decomposition level in a case of decomposition level 3;

DESCRIPTION OF THE PREFERRED EMBODIMENT

Figure 1:
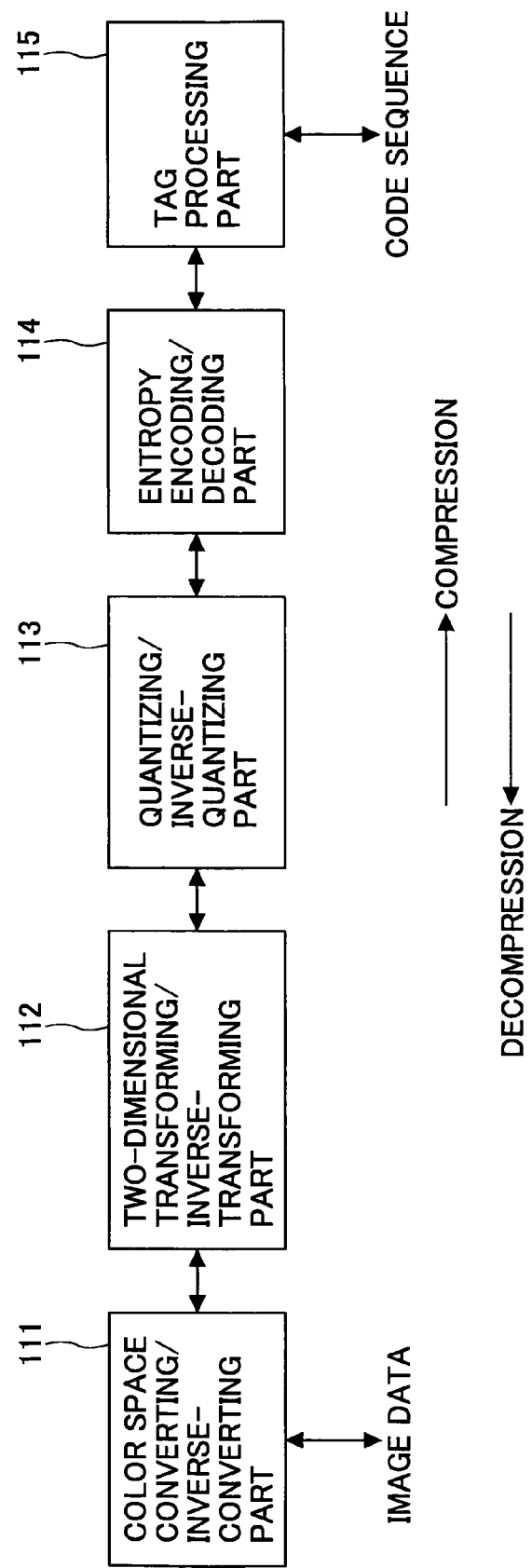
FIG. 1 is a block diagram for illustrating a basic JPEG 2000 algorithm.

Embodiments of the present invention comprise document processing apparatuses in which the above-mentioned problems are eliminated.

A more specific embodiment of the present invention saves capacity of the storage unit storing code data and control empty capacity of the storage unit by converting static images into a motion image.

The above embodiments of the present invention may be achieved by an image processing apparatus that includes a first converting unit to synthesize first code data including a plurality of code data sets where image data of a plurality of static images are compressed and encoded, and converts the first code data into second code data which are compressed and encoded to be a single code data sequence where a motion image aligns the static images in chronological order as consecutive frames. The image processing apparatus also includes a second converting unit to convert the second code data into the first code data.

According to one embodiment of the present invention, it is possible to not only convert the static images into the motion image but also convert the motion image into the static images. Accordingly, it is not required to store code data of original static images after the conversion from the original static images into the motion image. Therefore, it is possible to save capacity of the storage unit for storing the code data, and it is possible to control the empty capacity of the storage unit by converting the static images into the motion image.

In one embodiment of the image processing apparatus, the first code data may be code data compressed and encoded in accordance with the JPEG 2000 algorithm and the second code data may be code data compressed and encoded in accordance with the Motion JPEG 2000.

According to one embodiment of the present invention, static images compressed and encoded in accordance with JPEG 2000 can be converted into the code data. Therefore, it is possible to sequentially display frames showing the static images by using the code data after the conversion in chronological order, and it is possible to easily search for a specific static image.

One embodiment of the image processing apparatus may include a decompressing unit to decompress the first and second code data, and a displaying unit displaying the frames showing image data in chronological order at a display unit after the first and second code data are decompressed.

According to an embodiment of the present invention, the static images can be converted into the motion image. Therefore, it is possible to sequentially display the frames of the static images by using the code data after this conversion, and it is possible to easily search for a specific image.

One embodiment of the image processing apparatus may include a first accepting unit to accept a request for converting the first code data into the second code data from a user, in which the first converting unit converts the first code data into the second code data when the first accepting unit accepts the request.

According to one embodiment of the present invention, it is possible to convert the static images into the motion image in response to a request of the user.

One embodiment of the image processing apparatus may include a detecting unit to detect empty capacity of a storage unit storing the first and second code data, in which the first converting unit converts the first code data into the second code data when it is determined that the empty capacity detected by the detecting unit is lower than a predetermined reference value.

According to one embodiment of the present invention, it is possible to control the capacity of the storage unit by converting the static images into the motion image when the empty capacity of the storage unit becomes smaller.

In one embodiment of the image processing apparatus, the first converting unit selects code data having a predetermined resolution from the first code data, reduces the selected code data, and converts the reduced code data into the second code data, so as to integrate a plurality of static images in one frame.

According to an embodiment of the present invention, it is possible to reduce the amount of code data by converting the static images into the motion image, and it is possible to control the empty capacity of the storage unit.

One embodiment of the image processing apparatus may include a second accepting unit to accept a request for converting the first code data into the second code data where a plurality of static images are integrated into one frame, from the user, in which the first converting unit converts the first code data into the second code data when the second accepting unit accepts the request.

According to an embodiment of the present invention, it is possible to convert the static images into the motion image by integrating the plurality of static images by the request of the user.

One embodiment of the image processing apparatus may include a detecting unit to detect empty capacity of a storage unit storing the first and second code data, in which the first converting unit converts the first code data into the second code data when it is determined that the empty capacity detected by the detecting unit is lower than a predetermined reference value.

According to an embodiment of the present invention, the static images may be converted into the motion image when the empty capacity of the storage unit is smaller.

In one embodiment of the image processing apparatus, the second accepting unit may accept a request of an integration degree from the user; and the first converting unit may determine a number of static images to form each frame based on the integration degree accepted by the second accepting unit.

According to an embodiment of the present invention, it is possible to convert the static images into the motion image based on an integration degree requested by the user.

One embodiment of the image processing apparatus may include a third converting unit to convert current second code data into further second code data so as to increase the number of static images forming the frame when the empty capacity becomes lower than the predetermined reference value.

According to one embodiment of the present invention, it is possible to increase a degree of reducing the amount of code data by converting the static images into the motion image based on the empty capacity of the storage unit, so as to control the empty capacity of the storage unit.

In one embodiment of the image processing apparatus, the first converting unit may convert each code data set being the first code data with respect to only a specific area of a screen into the second code data.

According to one embodiment of the present invention, since the static images are converted into the motion image with respect to only the specific area of the screen, it is possible to further reduce the amount of code data.

In one embodiment of the image processing apparatus, the first converting unit may determine the specific area as a Region Of Interest.

According to one embodiment of the present invention, since the static images are converted into the motion image with respect to only the ROI, it is possible to further reduce the amount of code data.

One embodiment of the image processing apparatus may include a third accepting unit to accept an instruction of the specific area from the user, in which the first converting unit may convert the first code data into the second code data for only the specific area indicated when the third accepting unit accepts the instruction.

According to one embodiment of the present invention, since the static images are converted into the motion image with respect to only the specific area of the screen selected by the user, it is possible to further reduce the amount of code data.

In one embodiment of the image processing apparatus, the first converting unit may convert each code data set being the first code data into the second code data with respect to only a specific area of a screen, in that a progressive order is changed for each code data set being the first code data so that the second code data has the same progressive order for the frames.

According to one embodiment of the present invention, since the progressive order of the frames is identical, it is possible to display the image at higher speed.

One embodiment of the image processing apparatus may include a fourth accepting unit to accept an indication of a specific frame of the image data displayed by the displaying unit from a user, in which the second converting unit converts the second code data into the first code data for the specific frame when the fourth accepting unit accepts the indication.

According to one embodiment of the present invention, it is possible to allow the user to select a desired frame from a plurality of frames successively displayed at a display unit and to restore code data of the original static image.

In one embodiment of the image processing apparatus, the displaying unit may display a specific area of each frame for the image data.

According to one embodiment of the present invention, it is possible to successively display only the specific areas for a search.

The above embodiments of the present invention are achieved by an imaging apparatus including: an image pickup device imaging a static image; a compressing unit compressing and encoding image data imaged by the imaging pickup device; a storage unit storing code data being compressed; and an information processing unit processing the code data as first code data, wherein the information processing unit includes a first converting unit synthesizing the first code data including a plurality of code data sets where image data of a plurality of static images are compressed and encoded, and converting the first code data into second code data which are compressed and encoded to be a single code data sequence where a motion image aligns the static images in chronological order as consecutive frames; and a second converting unit converting the second code data into the first code data.

The above embodiments of the present invention can be achieved by a program code for causing a computer to conduct processes described above in the image processing apparatus or by a computer-readable recording medium recorded with the program code.

In the following, an embodiment of the present invention according to a document processing apparatus will be described with reference to the accompanying drawings.

Overview of JPEG 2000 Algorithm

First, an overview of the JPEG 2000 Algorithm as a fundamental technology of the present invention is provided.

FIG. 1 is a diagram for illustrating the basic JPEG 2000 algorithm. The JPEG 2000 algorithm includes a color space converting/inverse-converting unit 111, a two-dimensional wavelet transforming/inverse-transforming unit 112, a quantizing/inverse-quantizing unit 113, an entropy encoding/decoding unit 114, and a tag processing unit 115.

Figure 2:
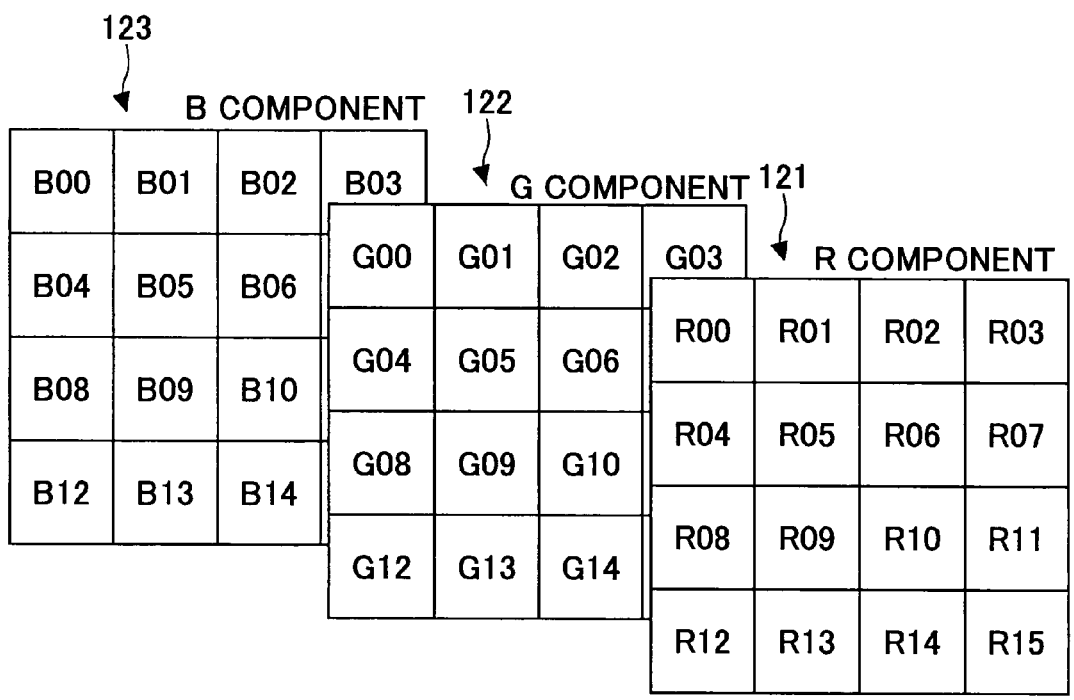
FIG. 2 is a diagram for illustrating each component of a color image.

As shown in FIG. 2, components of a color image as an original image are generally divided into oblong areas (tiles) 121, 122, and 123 corresponding to RGB elementary colors. Then, for example, each tile of R00, R01, ..., R15, G00, G01, ..., G15, and B00, B01, ..., B15 becomes a basic unit for executing a compression/decompression process. Accordingly, a compression/decompression operation is individually conducted for each component and then conducted for each tile.

When image data are encoded, after data of each tile of each component are input to the color space converting/inverse converting unit 111 and a color space conversion is conducted, a two-dimensional wavelet transform (sequence transform) is applied so as to divide the color space into frequency bands.

FIG. 3 is a diagram showing sub bands of each decomposition level in a case of (Note: These articles are okay, but it reads better if we reduce "article clutter".) decomposition level 3. In FIG. 3, sub bands are shown in each decomposition level in the case of decomposition level 3. That is, the two-dimensional wavelet transform is conducted with respect to an original image tile (OLL) (as decomposition level 0 (131)) obtained by dividing the original image into tiles, and then the sub bands (1LL, 1HL, 1LH, 1HH) shown in decomposition level 1 (132) are divided. Subsequently, the two-dimensional wavelet transform is conducted with respect to the sub band 1LL being a lower frequency component in this decomposition level 1, and then the sub band 1LL is further divided into sub bands (2LL, 2HL, 2LH, 2HH). In the same manner, sequentially, the two-dimensional wavelet transform is conducted with respected to the sub band 2LL being a lower frequency component and then the sub band 2LL is furthermore divided into sub bands (3LL, 3HL, 3LH, 3HH) shown in decomposition level 3 (134). In FIG. 3, the sub bands subject to be encoded in each decomposition level are shown as shaded areas. For example, in the case of decomposition level 3, the sub bands (3HL, 3LH, 3HH, 2HL, 2LH, 2HH, 1HL, 1LH, 1HH) being shaded are to be encoded, and the sub band 3LL is not to be encoded.

Figure 5:
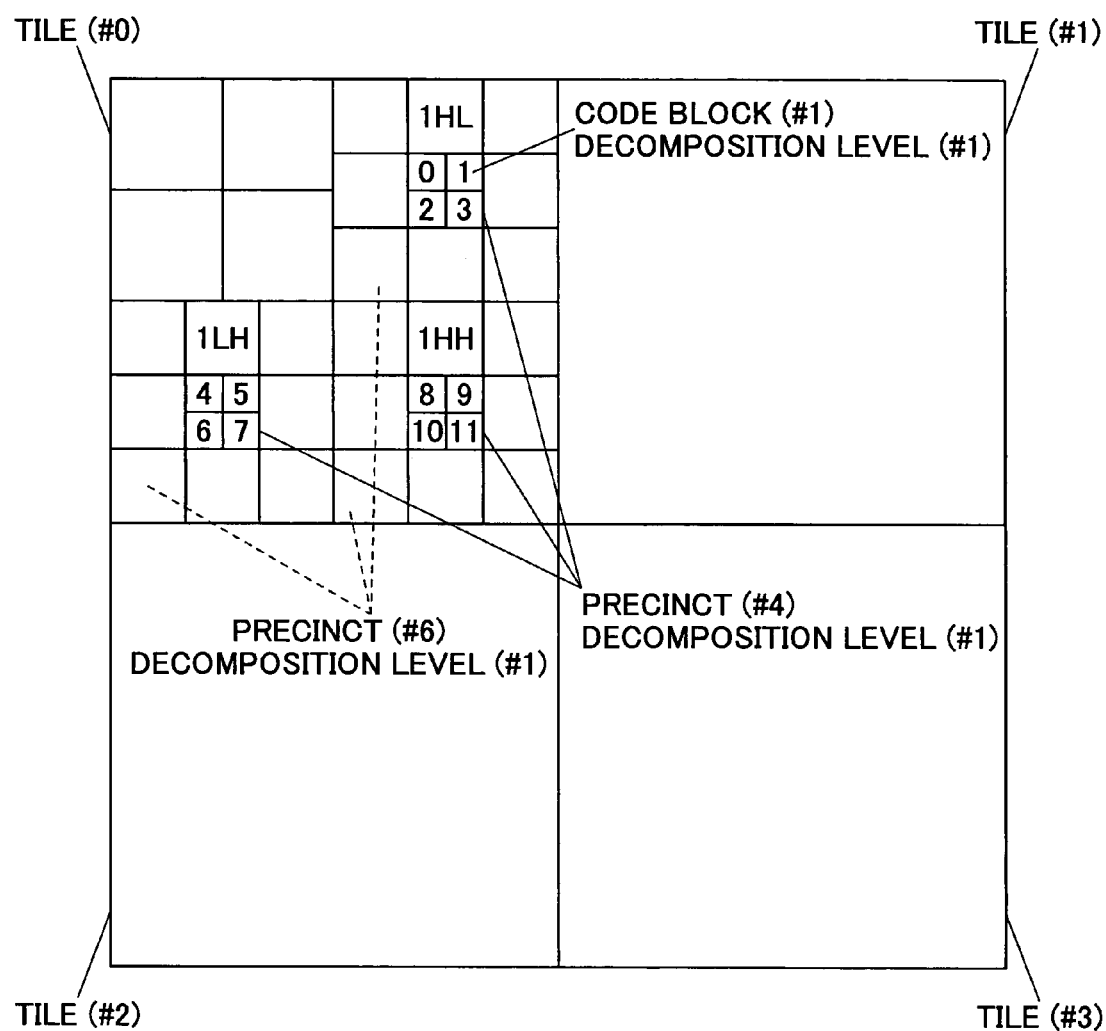
FIG. 5 is a diagram for illustrating that one precinct is formed by three rectangle areas that are spatially identical.

Next, subject bits to be encoded are determined in accordance with an order of an instructed encoding method, and then a context is generated from bits around the subject bits by the quantizing/inverse-quantizing unit 113. A wavelet coefficient after the quantizing process is divided into oblong areas called a precinct that is not duplicated for each sub band. This operation is introduced in order to effectively use computer memory for an implementation. As shown in FIG. 5, one precinct is formed by three oblong areas that are spatially corresponding. Moreover, each precinct is divided into oblong "code blocks" which are not duplicated. The code block is a basic unit for conducting an entropy coding process.

Figure 6:
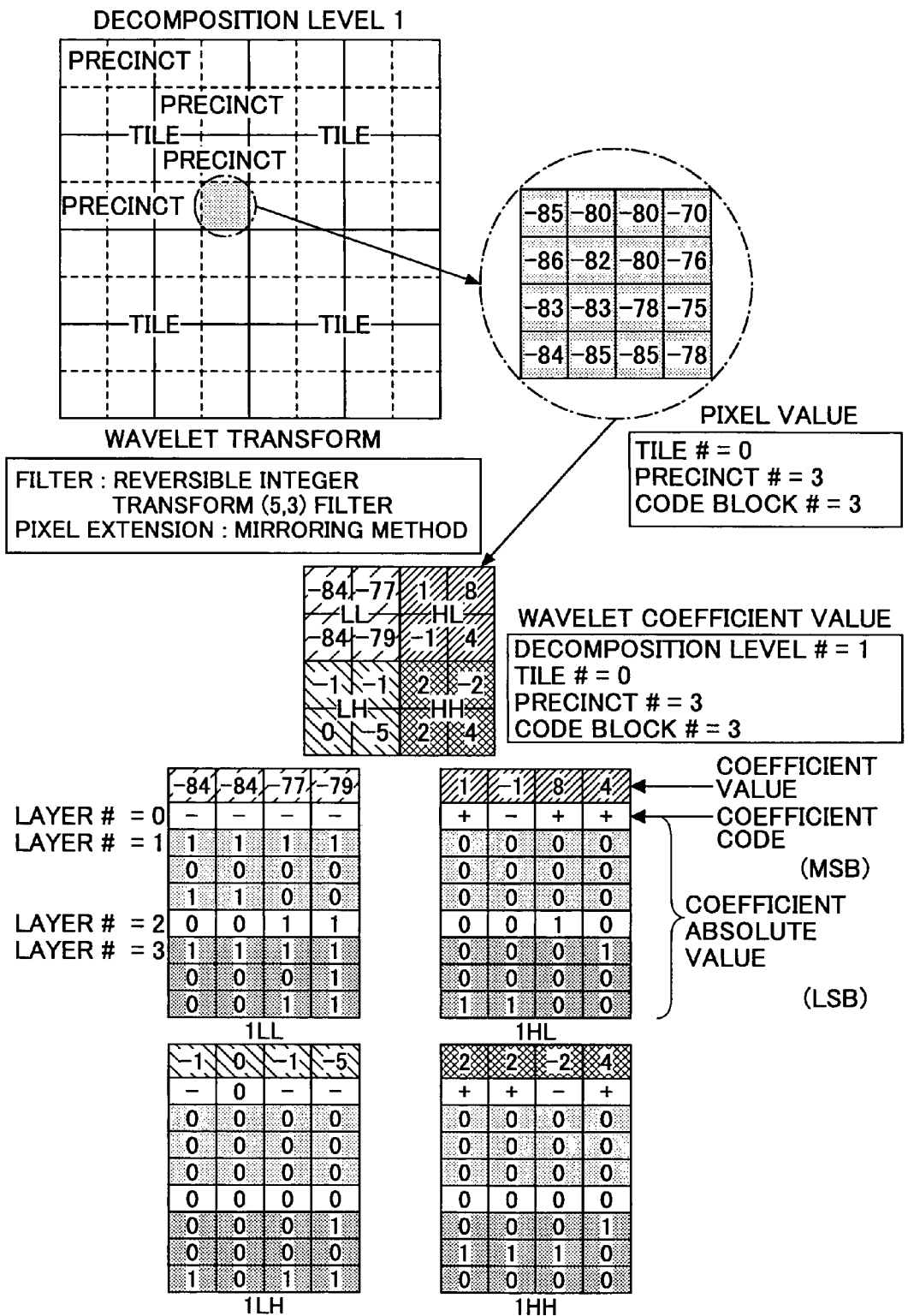
FIG. 6 is a diagram briefly illustrating steps of ordering.

The wavelet coefficient values after the wavelet transform can be quantized and then encoded. In order to improve encoding efficiency in the JPEG 2000, the wavelet coefficient values are decomposed into a "bit plane" unit. Accordingly, it is possible to order bit planes for each image or each code block. FIG. 6 is a diagram briefly illustrating steps of ordering. This example shows a case of dividing the original image (32×32 pixels) into four tiles having 16×16 pixels, and sizes of the precinct and the code block in decomposition level 1 are 8×8 pixels and 4×4 pixels, respectively. The precincts and the code blocks are numbered in a cluster order. A mirroring method is conducted for an image expansion with respect to out of border tiles. The wavelet transform is conducted by an inverse (5×3) filter, and then the wavelet coefficient values of decomposition level 1 are obtained. A typical layer structure is also shown by tile 0, precinct 3, and code block 3. From the view of a lateral direction (bit plane direction), it is difficult to understand the layer structure. One layer is formed by any number of bit planes. In this example, each of layers 1 and 3 is formed by three bit planes 1, 2, and 3; each of layers 0 and 2 is formed by bit plane 1. The closer to LSB is the layer that includes bit planes, the more likely is the layer to be quantized. On the contrary, the closer to MSB is the layer that includes bit planes, the more likely the layer remains until the end of quantization. A method of discarding the layer closer to LSB is called truncation, which can control a quantization ratio finely.

Figure 4:
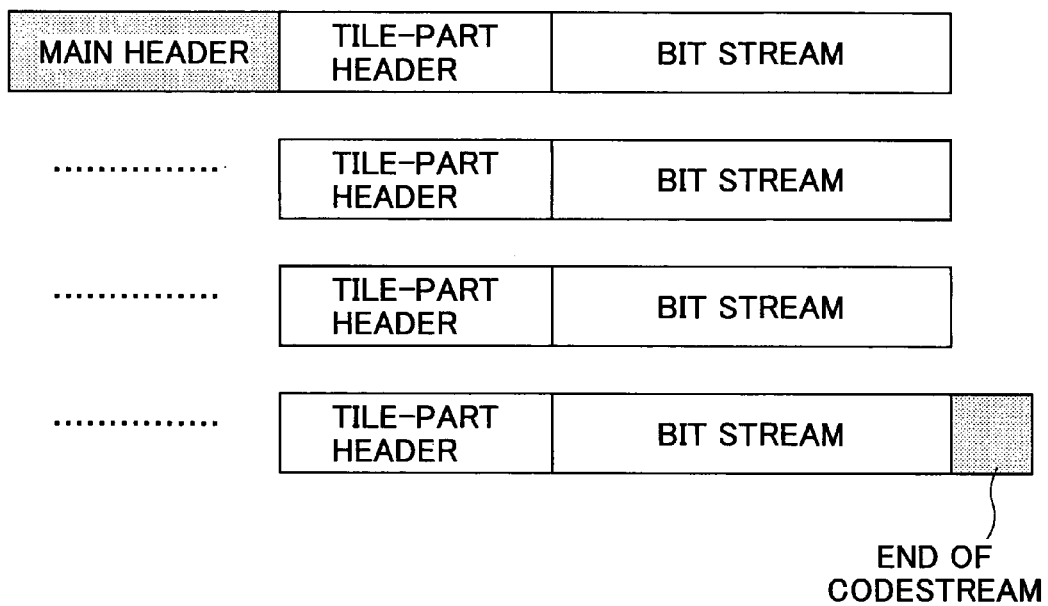
FIG. 4 is a data diagram illustrating a structure of the code stream.

The entropy encoding/decoding unit (refer to FIG. 1) conducts an encoding process for tiles of each component by a probability presumption based on the context and the subject bits. In the same manner, the encoding process is conducted by each tile unit for all components of the original image. Finally, the tag processing unit 115 connects all code data from the entropy encoding/decoding unit 114 to a single code stream, and adds a tag to the single code stream. FIG. 4 is a diagram illustrating a structure of the code stream. As shown in FIG. 4, tag information as a main header is additionally provided at the beginning of the code stream and also the tag information as a tile-part header is additionally provided at the beginning of the code data forming each tile, and the code data of each tile follows the tile-part header. Then, tag information is provided at the end of the code stream.

Contrary to the encoding process, a decoding process generates image data from the code stream of each tile of each component. The decoding process will be briefly described next with reference to FIG. 1. In the decoding process, the tag processing unit 115 interprets the tag information additionally provided to the code stream that is externally input, decomposes the code stream into the code stream of each tile of each component, and conducts the decoding process for each code stream of each tile of each component. Each location of subject bits to be decoded is determined by an order according to the tag information in the code stream. (Note: Sentence moved to below.) At the entropy encoding/decoding unit 114, the decoding process is conducted by the probability presumption from the context and the code stream to generate the subject bits, and the subject bits are written at locations of subject bits. Then, the context is generated from an arrangement of bits that are located around the subject bits and are decoded, by the quantizing/inverse-quantizing unit 113. Since data decoded in this manner are spatially divided into each frequency band, each tile of each component of the image data is restored by the two-dimensional wavelet inverse-transform conducted by the two-dimensional wavelet transforming/inverse-transforming unit 112. The restored data are converted into an original color system by the color space converting/inverse-converting unit 111.

The overview of the "JPEG 2000" algorithm is described above. The "Motion JPEG 2000" algorithm is where the algorithm for a static image, that is, a single frame, is enhanced to include a plurality of frames.

Figure 7:
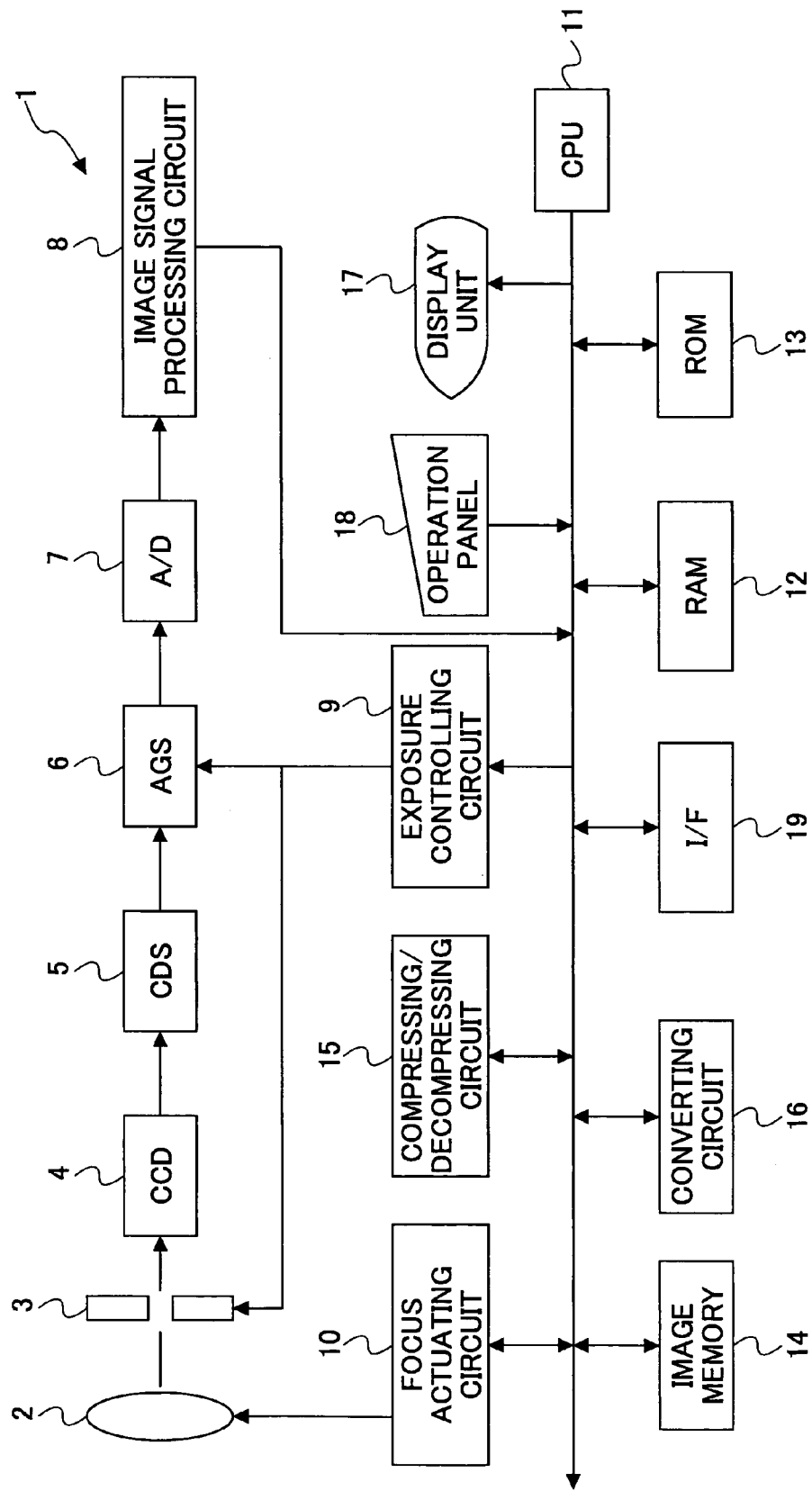
FIG. 7 is a block diagram illustrating a digital still camera according to an embodiment of the present invention.

FIG. 7 is a block diagram illustrating a digital still camera according to an embodiment of the present invention. As shown in FIG. 7, the digital still camera 1 (hereinafter, simply called "camera 1") is a camera realizing an imaging apparatus and includes a lens 2, an aperture 3, a CCD (Charge Coupled Device) image sensor 4 as an image pickup device, a CDS (Correlated Double Sampling) circuit 5 for reducing noise of storage electrodes of the CCD image sensor 4, an A/D converting circuit 7 for conducting an A/D (analog-to-digital) conversion of analog image data captured by the CCD image sensor 4, an image signal processing circuit 8 for conducting predetermined signal processing on digital image data after the A/D conversion by the A/D converting circuit 7, an exposure controlling circuit 9 for controlling the aperture 3, shutter speed, and the AGC circuit 6, and a focus actuating circuit 10 for actuating the lens 2.

In addition, the camera 1 includes a CPU (Central Processing Unit) 11 for intensively controlling each part of the camera 1, a ROM (Read-Only Memory) 13 for storing various control programs used by the CPU 11, a RAM (Random Access Memory) 12 as a work area used by the CPU 11, an interface 19 for communicating with an external personal computer, an image memory 14 as a storage unit, a compressing/decompressing circuit 15 for compressing and encoding image data or a like after a process by the image signal processing circuit 8 to generate code data and decompressing the code data, a converting circuit 16 for converting the code data, a display unit 17 as an LCD (Liquid Crystal Display) for displaying various messages, and an operating panel 18 for accepting various operations.

Figure 8:
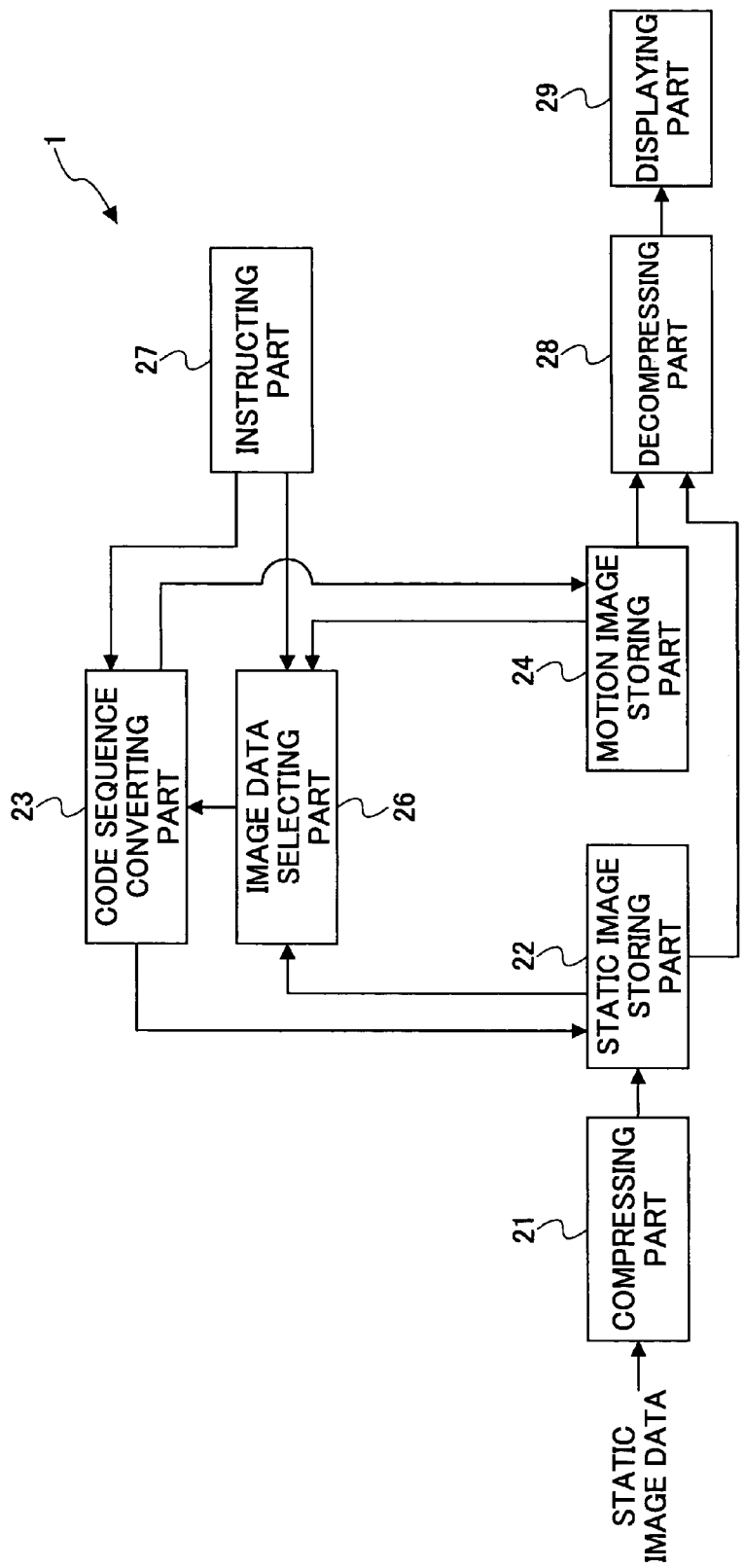
FIG. 8 is a functional block diagram for illustrating a process executed by the CPU of the camera based on the programs stored in the ROM, according to an embodiment of the present invention.

FIG. 8 is a functional block diagram for illustrating processes executed by the CPU 11 of the camera 1 based on the programs stored in the ROM 13, according to an embodiment of the present invention. An image processing apparatus of the present invention is structured in accordance with functional blocks shown in FIG. 8. A compressing unit 21 compresses and encodes digital image data of a static image that are captured by the CCD 4 and processed by the image signal processing circuit 8 in accordance with the JPEG 2000 algorithm (compressing unit). The code data (first code data) after the compressing and encoding process are stored in the image memory 14 by a static image storing unit 22. A code sequence converting unit 23 converts the first code data stored in the image memory 14 into code data (second code data) compressed and encoded in accordance with the Motion JPEG 2000 algorithm. The code sequence converting unit 23 may convert this second code data into the first code data. A motion image storing unit 24 stores the second code data converted by the code sequence converting circuit 23 in the image memory 14. An image data selecting unit 26 selectively outputs the first or second code data stored in the image memory 14 to the code sequence converting unit 23. An instructing unit 27 accepts various instructions from a user through the operation panel 18. A decompressing unit 28 decompresses the first or second code data stored in the image memory 14. A displaying unit 29 displays the image data decompressed by the decompressing unit 28 at the display unit 17. In this embodiment, the compression and decompression of the image and the conversion of the code data conducted by the compressing unit 21, the decompressing unit 28, and the code sequence converting unit 23 are conducted by using the compressing/decompressing circuit 15 and the converting circuit 16. Alternatively, the entire or a part of these processes can be realized by processes executed by the CPU 11.

Figure 9:
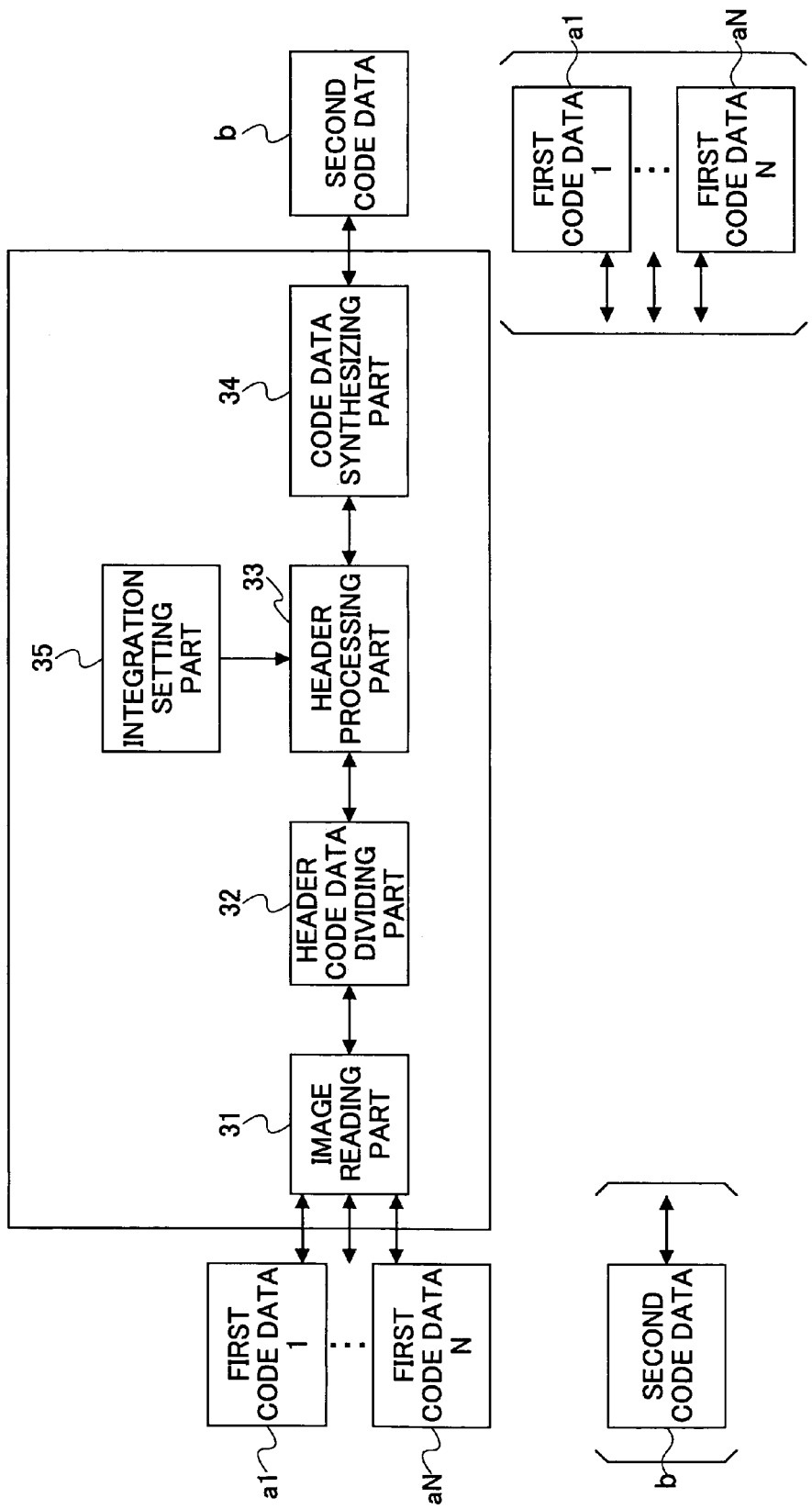
FIG. 9 is a functional diagram block for illustrating processes conducted by the code sequence converting unit in detail, according to an embodiment of the present invention.

FIG. 9 is a functional diagram block for illustrating processes conducted by the code sequence converting unit 23 in detail, according to the first embodiment of the present invention. The code sequence converting unit 23 includes an image reading unit 31, a header code data dividing unit 32, a header processing unit 33, a code data synthesizing unit 34, and an integration setting unit 35.

First, the image reading unit 31 sequentially reads first code data a1 through aN. The code data a1 read at first is divided into a header unit and a code unit by the header code data dividing unit 32. The integration setting unit 35 sets each of the first code data a1 through aN so as to integrate, for example, four sheets, eight sheets, or 16 sheets within one frame. This setting is selectively conducted based on a user request. That is, in response to a setting of the integration setting unit 35, an image size of a main header divided by the header code data dividing unit 32 is changed into another image size after the first code data a1 through aN are integrated, and a new tile part header is generated. A tile index is additionally provided to the tile part header.

Subsequently, the same process is conducted on a second frame, a third frame, . . . of the second code data. As described above, the image reading unit 31 reads the first code data, the header code data dividing unit 32 divides the header and the code data, and the header processing unit 33 changes the main header to the tile part header. Then, the tile index is sequentially provided. When all headers of the first code data are completely processed, the code data synthesizing unit 34 synthesizes the first code data a1 through aN to create the second code data based on the Motion JPEG 2000. Accordingly, the first code data a1 through aN are converted into the second code data that is a single code data set where a motion image is compressed and encoded. The motion image aligns static images in chronological order, each of which is defined as a frame.

In addition, the code sequence converting unit 23 can inversely convert from the second code data to the first code data by following in reverse the processes described above, which are conducted by the image reading unit 31, the header code data dividing unit 32, the header processing unit 33, and the code data synthesizing unit 34 (refer to contents in parentheses in FIG. 9).

Figure 10:
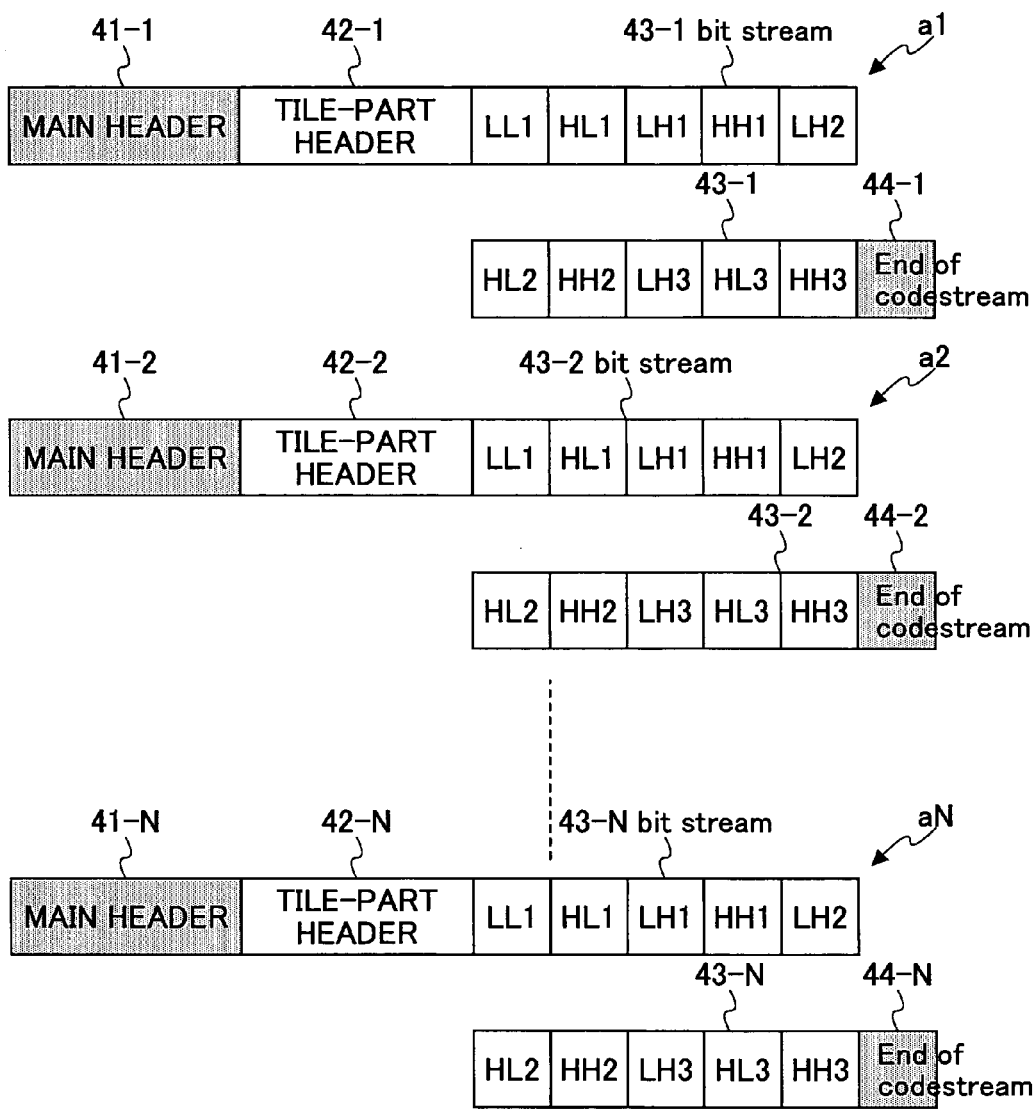
FIG. 10 is a data diagram for illustrating a data structure of the first data a1 through aN prior to the process of the code sequence converting unit, according to an embodiment of the present invention.

FIG. 10 is a diagram for illustrating a data structure of the first data a1 through aN prior to the process of the code sequence converting unit 23, according to one embodiment of the present invention. In FIG. 10, the first code data a1 as a first data set, the first code data a2 as a second data set, ..., and the first code data aN as an nth data set are synthesized. The first code data a1 as the first data set is formed by a main header 41-1, a tile part header 42-1, a bit stream 43-1 (including component LL1 through component HH3), and an EOC (End Of Code-stream) marker 44-1, the second code data a2 as the second data set is formed by a main header 41-2, a tile part header 42-2, a bit stream 43-2 (including component LL1 through component HH3), and an EOC (End Of Code-stream) marker 44-2, ..., the nth code data aN as the nth data set is formed by a main header 41-N, a tile part header 42-N, a bit stream 43-N (including component LL1 through component HH3), and an EOC (End Of Code-stream) marker 44-N. For the sake of convenience, it is assumed that all the first code data sets input to the code sequence converting unit 23 have the same tile size.

Figure 11:
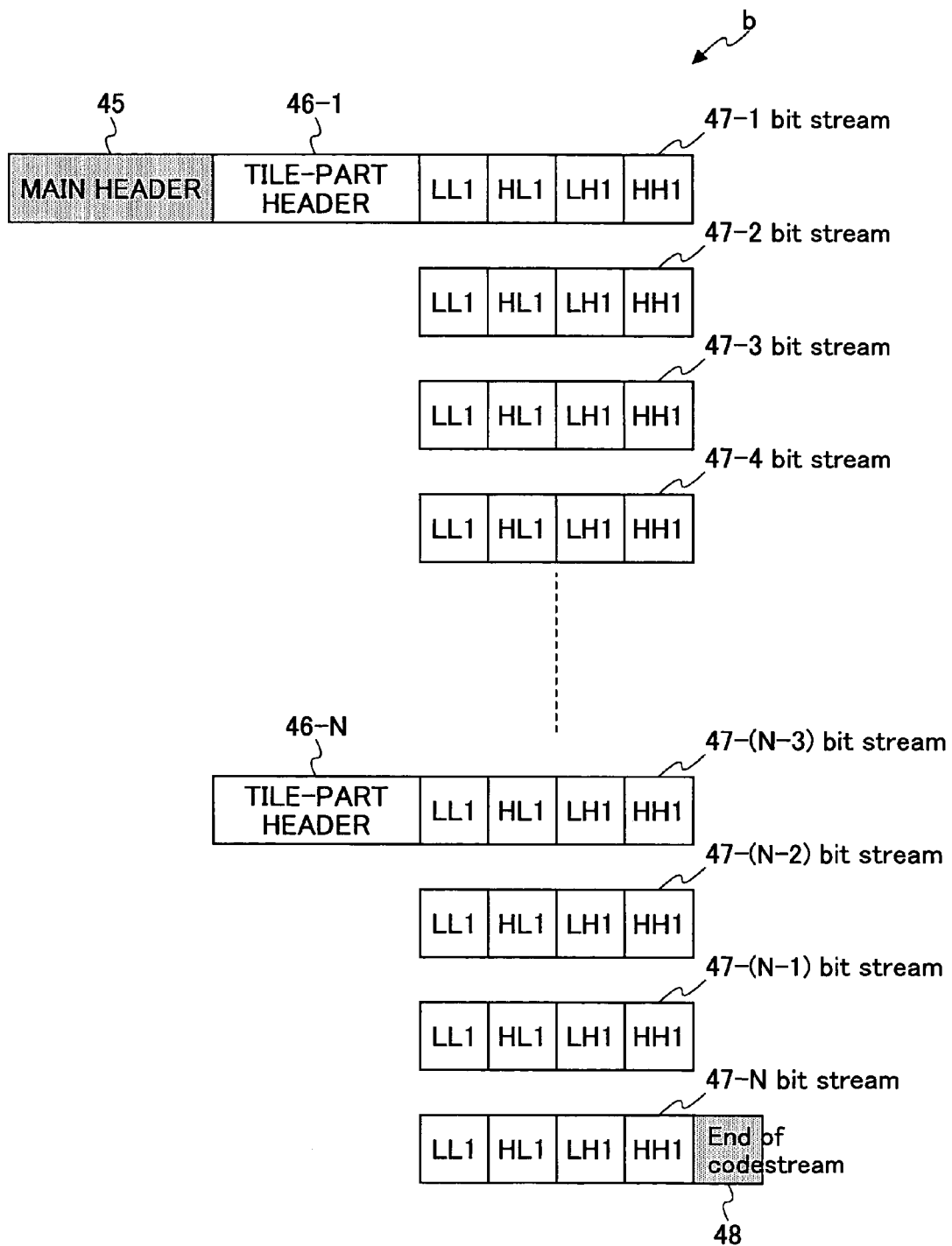
FIG. 11 is a data diagram for illustrating a data structure of the second code data converted from the first code data by the code sequence converting unit, according to an embodiment of the present invention.

FIG. 11 is a diagram for illustrating a data structure of the second code data converted from the first code data by the code sequence converting unit 23, according to one embodiment of the present invention. In FIG. 11, the second code data b includes a main header 45, tile part headers 46-1 through 46-N, bit streams 47-1 through 47-N, and an EOC marker 48. For the sake of convenience, it is assumed that each frame of the second code data b forms one tile. In this embodiment, every four sheets of static images are integrated into one frame from the first code data a1 through aN. Data having a predetermined resolution are selected from the four sheets of static images in the first code data a1 through aN. For example, the components LL1, HL1, LH1, and HH1 (components LL, HL, LH, and HH of decomposition level 1) are retrieved and defined as the bit frames 47-1 through 47-N for each frame (single tile as described above).

Figure 12:
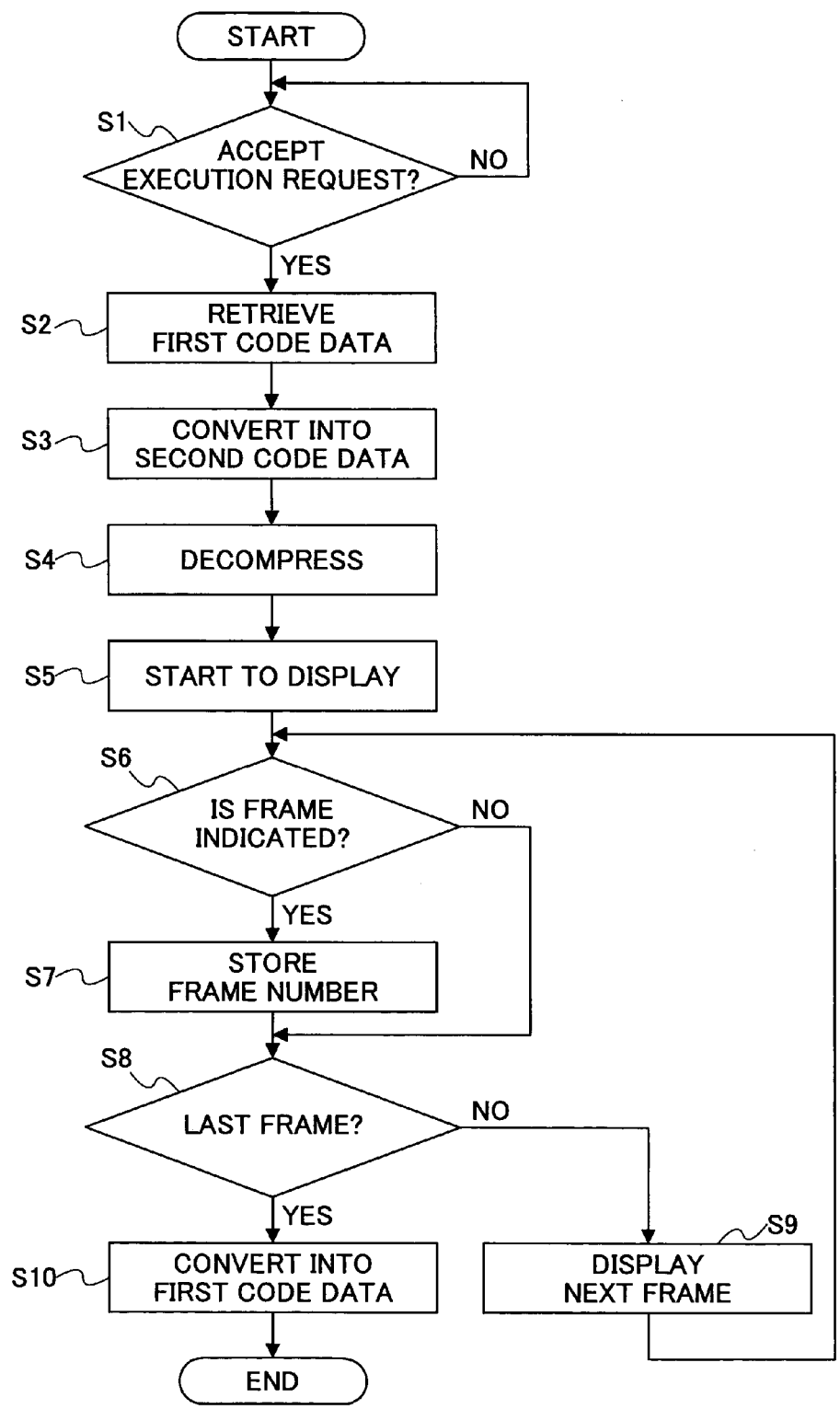
FIG. 12 is a flowchart for illustrating a process conducted by the CPU, according to an embodiment of the present invention.

FIG. 12 is a flowchart for illustrating a process conducted by the CPU 11, according to one embodiment of the present invention. The process is started by accepting an execution request of a predetermined process from a user by the instructing unit 27 (Yes of step S1). That is, the execution request accepted in step S1 is to photograph an image by the camera 1, convert the first code data being compressed, encoded, and stored in the image memory 14, and display an image based on the second code data b by the displaying unit 29 (first accepting unit).

Moreover, an instruction illustrating whether image integration is conducted, and how many sheets, 2 sheets, 4 sheets, or 8 sheets are integrated in one frame if the image integration is indicated, is also accepted (second accepting unit).

In addition, an instruction showing whether a range of a specific area of each static image shown by the first code data is indicated to convert the first code data to the second code data b is accepted. Furthermore, an instruction indicating the range is also accepted if the range is indicated (third accepting unit).

When the execution request of the predetermined process is accepted (Yes of step S1), the image data selecting unit 26 retrieves each of the first code data a1 through aN of images that are photographed and stored in the image memory 14 (step S2). As described with reference to FIG. 9 through FIG. 11, the code sequence converting unit 23 synthesizes first code data a1 through aN so as to convert the first code data into the second code data b (first converting unit) (step S3). After this conversion, the first code data are not required to be stored in the image memory 14.

Figure 13A:
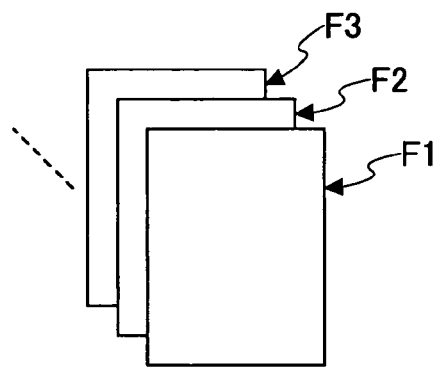
FIG. 13A through FIG. 13D are schematic diagrams illustrating the second code data converted from the first code data, according to the first embodiment of the present invention.
Figure 13B:
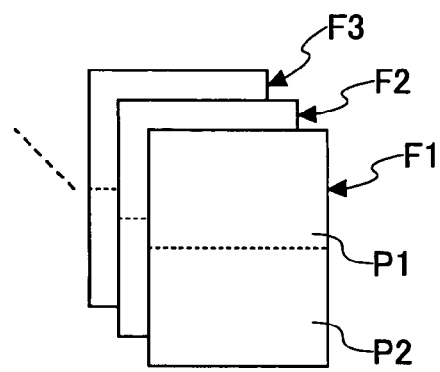
Figure 13C:
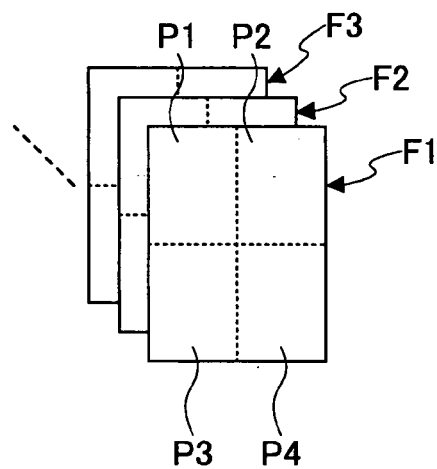
Figure 13D:
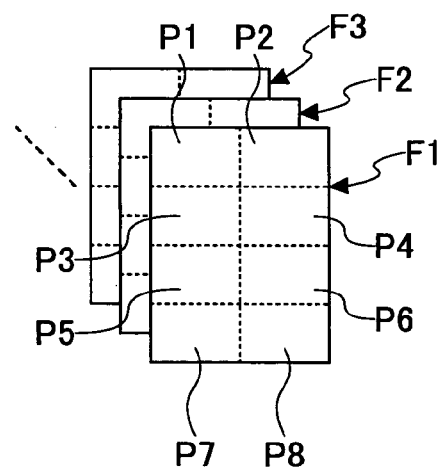

FIG. 13A through FIG. 13D are schematic diagrams illustrating the second code data converted from the first code data, according to one embodiment of the present invention. In FIG. 13A through FIG. 13D, the second code data b are formed by frames F1, F2, F3, ... When image integration is not indicated in step S1, as shown in FIG. 13A, every static image sheet of each first code data set forms a single frame F1, F2, F3, ... When the image integration of "two pictures in one frame" is indicated, as shown in FIG. 13B, every two static images (pictures P1 and P2) of each first code data set are reduced to form a single frame F1, F2, F3, ... As shown in FIG. 13C, every four static images (pictures P1, P2, P3, and P4) of each first code data set are reduced to form a single frame F1, F2, F3, ... As shown in FIG. 13D, every four static images (pictures P1 through P8) of each first code data set are reduced to form a single frame F1, F2, F3 ...

In addition, in step S1, when the user selects a process for converting the first code data into the second code data without indicating the range of the specific area of each static image shown by the first code data, the entire static image of each first code data set becomes one frame of the second code data (as described above, when image integration is conducted, two static images, four static images, or eight static images are reduced so as to form one frame).

Figure 14A:
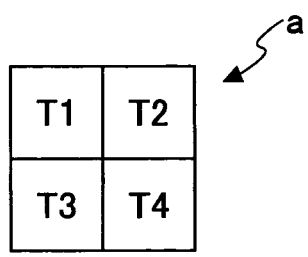
FIG. 14A through FIG. 14D are diagrams for illustrating a case of retrieving only a specific area and converting first code data into the second code data, according to an embodiment of the present invention.
Figure 14B:
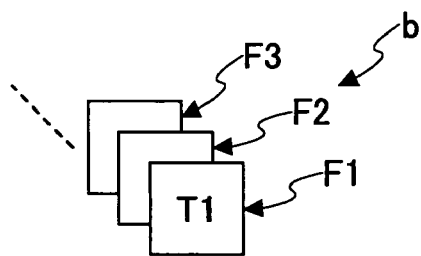

In step S1, when the user selects a process for converting the first code data into the second code data by indicating the range of the specific area of each static image shown by the first code data, the image of the specific area is read out to be converted into the second code data. For example, when each first code data set forms one static image by four tiles T1 through T4 as shown in FIG. 14A, the user can select any one of the tiles T1 through T4. In detail, the user operates the operation panel 18 to indicate an upper left (T1), an upper right (T2), a lower left (T3), or a lower right (T4) tile. For example, when the user indicates the upper left (T1), as shown in FIG. 14B, only the tile T1 of each static image of the first code data a1 is read out. Then, each tile T1 becomes one of frames F1, F2, F3, ... of the second code data b.

Figure 14C:
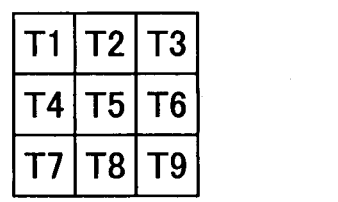
Figure 14D:
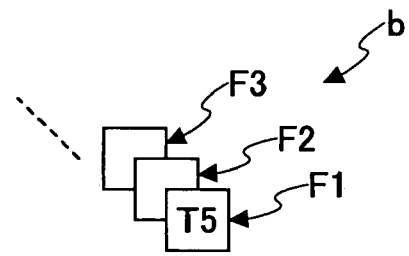

In this case, the user can indicate an ROI (Region Of Interest) as the specific area. For example, as shown in FIG. 14C, in a case where each first code data ai forms a single static image by nine tiles T1 through T9, if the ROI is set in the center of the tile T5 (header information of the first code data records which tile Ti includes the ROI), only the tile T5 of each static image of the first code data ai is read out and each tile T5 forms one of frames F1, F2, F3, ... of the second code data b.

As described above, in a case where the range of the specific area of each static image is shown by the first code data a1 and the process for converting the first code data into the second code data b is conducted, a progressive order such as a layer, a resolution, a component, a location, and the like may be changed so as to have the same progressive order for each frame F1, F2, F3, ... in the second code data b.

As described above, when the code sequence converting unit 23 converts the first code data ai into the second code data b by synthesizing the first code data ai (step S3), the decompressing unit 28 decompresses the second code data b after this conversion (compressing unit) (step S4), and the displaying unit 29 starts to display the image data at the display unit 17. That is, the first frame of the image data is displayed (displaying unit) (step S5). In this displaying manner, the frames are sequentially displayed, that is, the frames are displayed as a slide show. The speed for switching the frames is controlled so that the user can sufficiently visually recognize each frame of the motion image. The speed for switching the frames may be selected by the user. Only the specific area of each frame (for example, the ROI) may be displayed. When the frame is indicated by the user operating the operation panel 18 while being displayed (fourth accepting unit) (Y of step S6), a frame number of the frame is stored in the RAM 12 (step S7). Subsequently, the next frame is displayed (step S9) and steps S6 through S8 are repeated. When the last frame is displayed (Y of step S8), as described above, the second code data b are converted into the first code data ai by the code sequence converting unit 23 and the first code data ai are stored in the image memory 14 (second converting unit) (step S10). In this conversion conducted for each frame recorded in step S7, only the static image of each frame is converted into the first code data ai.

Figure 15:
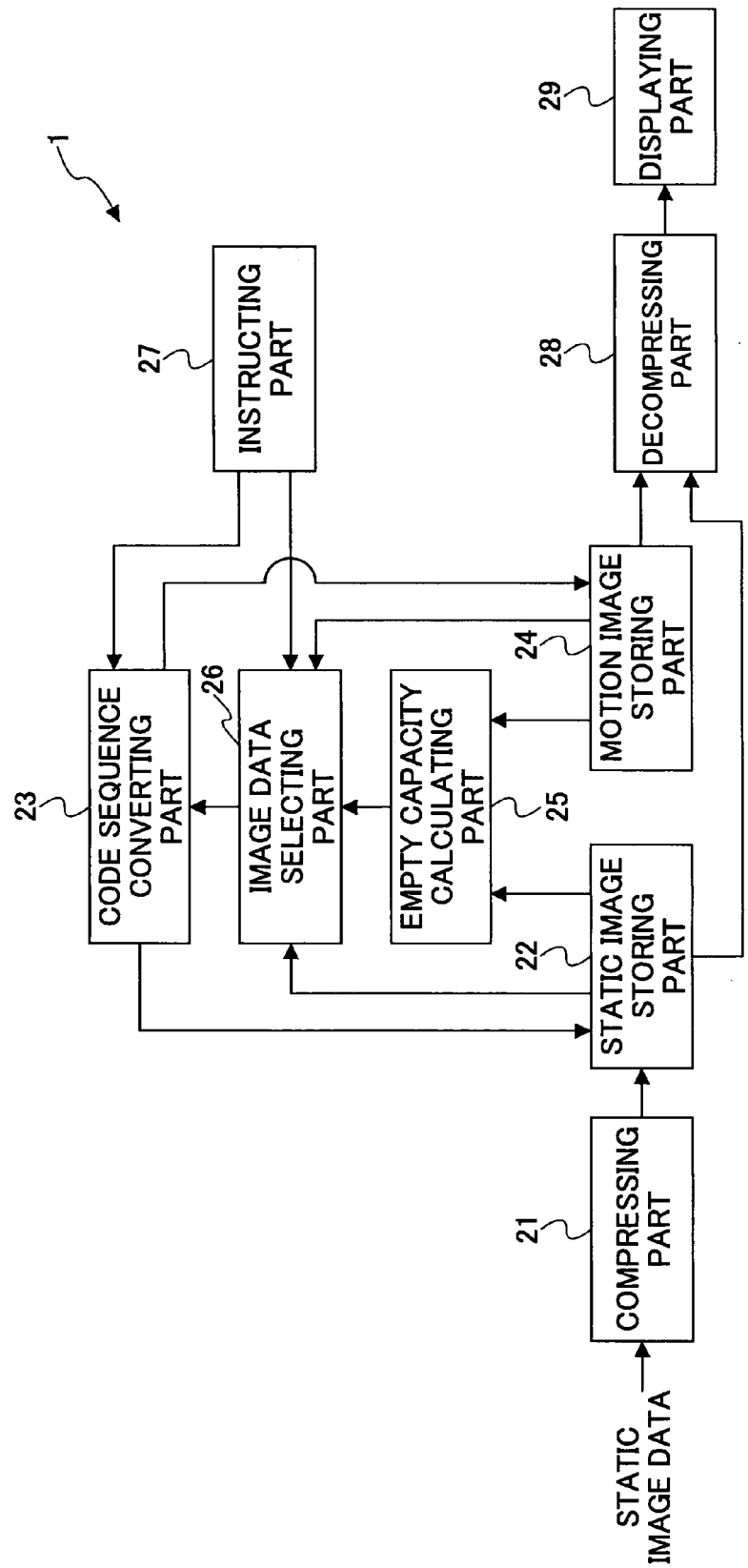
FIG. 15 is a functional block diagram illustrating a digital still camera according to one embodiment of the present invention.

In the camera 1, according to another embodiment of the present invention, functional components that are the same as the ones in a previously described embodiment are indicated by the same reference numerals and the explanation thereof will be omitted. In the following, different points from a previously described embodiment will be mainly described in one embodiment. As shown in FIG. 15, the camera 1 according to the one embodiment of the present invention includes an empty capacity calculating unit 25 for calculating the empty capacity of the image memory 14 in addition to the functional components the same as in a previously described embodiment of the present invention. As an assumption of the functional blocks shown in FIG. 15, processes shown in FIG. 16 and FIG. 17 are conducted, instead of the process shown in FIG. 12.

Figure 16:
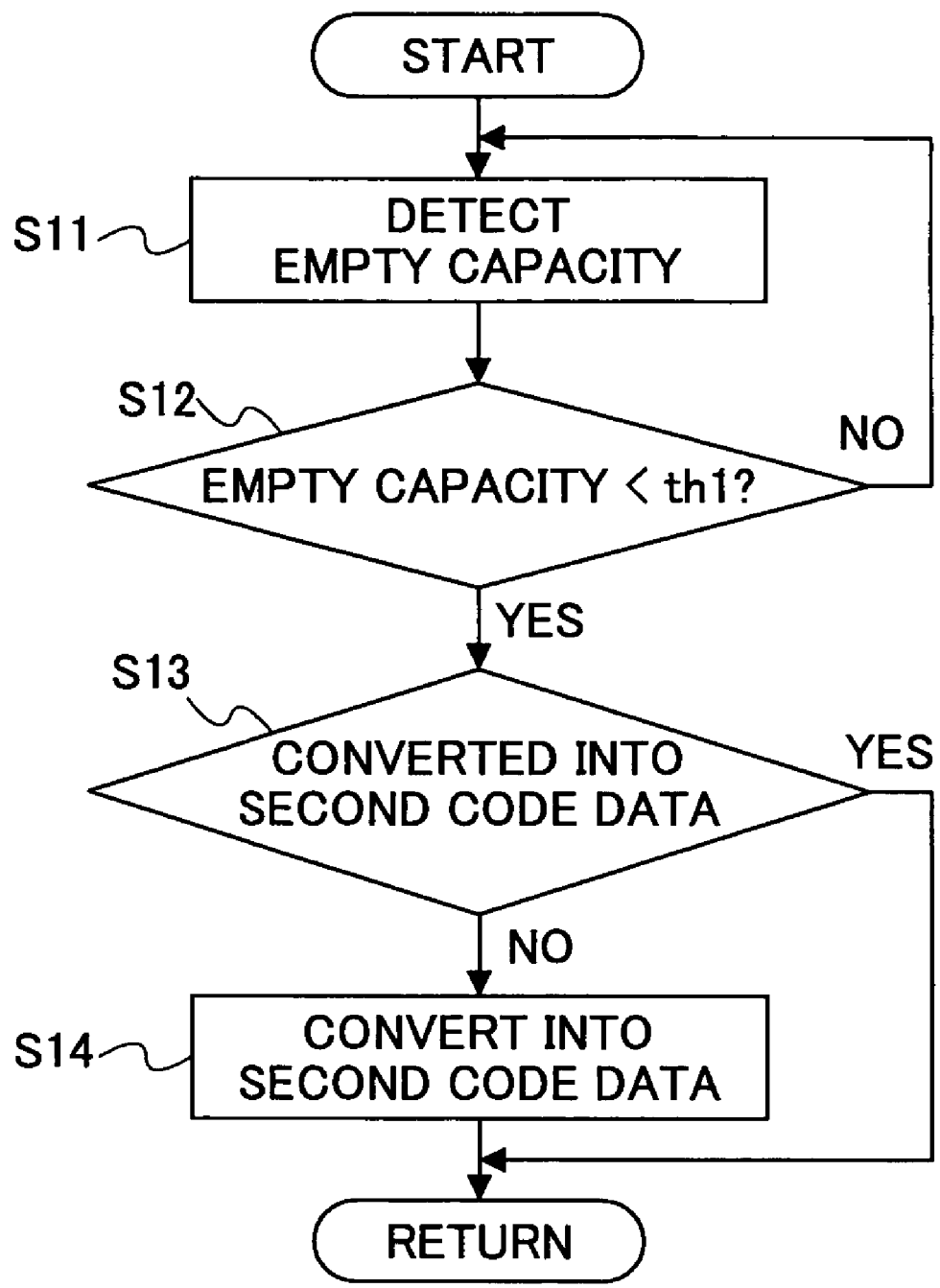
FIG. 16 is a flowchart for illustrating a process executed by the digital still camera according to one embodiment of the present invention.

As shown in FIG. 16, first, the empty capacity calculating unit 25 obtains the empty capacity of the image memory 14 (detecting mean) (step S11) and compares the empty capacity with a threshold th1 as a predetermined reference value (step S12). When it is determined that the empty capacity is not sufficient since the empty capacity is lower than threshold th1 (Y of step S12) and the first code data ai have not yet been converted into the second code data b (N of step S13), the first code data ai are converted into the second code data b similar to a previously described embodiment (first converting unit) (step S14). In the case of this conversion, as described with reference to FIG. 13, some static images may be integrated. Alternatively, as described with reference to FIG. 14A through FIG. 14D, only the specific area in the image may be converted into the second code data b (the specific area may be indicated by the user in this case).

Figure 17:
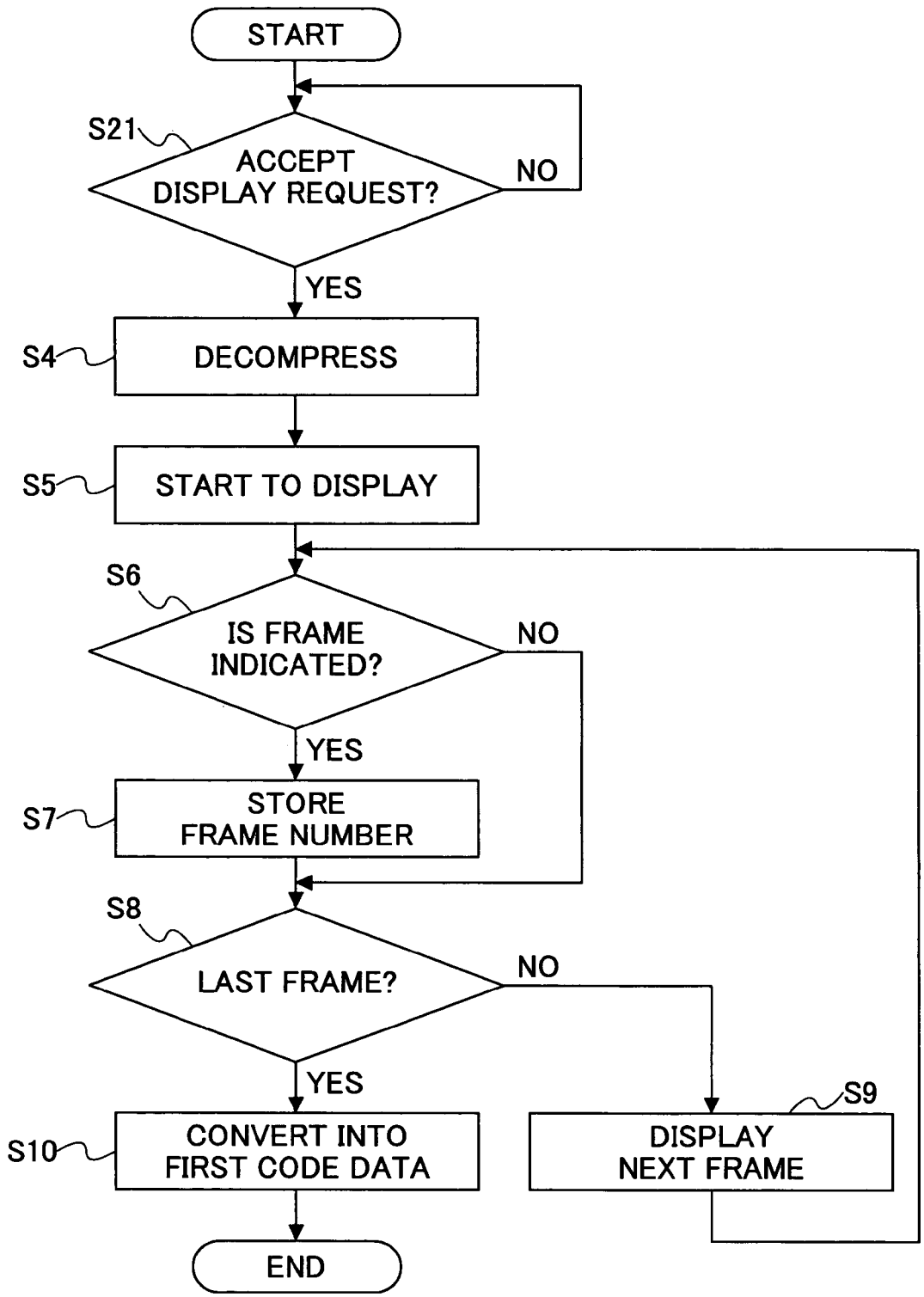
FIG. 17 is a flowchart for illustrating the process executed by the digital still camera according to the one embodiment of the present invention.

In order to display the motion image of the second code data b after the conversion, the process shown in FIG. 17 is conducted. That is, as shown in FIG. 17, when an instruction instructing to display the motion image of the second code data b is accepted from the user operating the operation panel 18 (Y of step S21), processes of steps S4 through S10 described with reference to FIG. 12 are conducted.

In the camera 1, according to still another embodiment of the present invention, functional components that are the same as the ones in a previously described embodiment are indicated by the same reference numerals and the explanation thereof will be omitted. In the following, different points from a previously described embodiment will be mainly described in the following embodiment.

Figure 18:
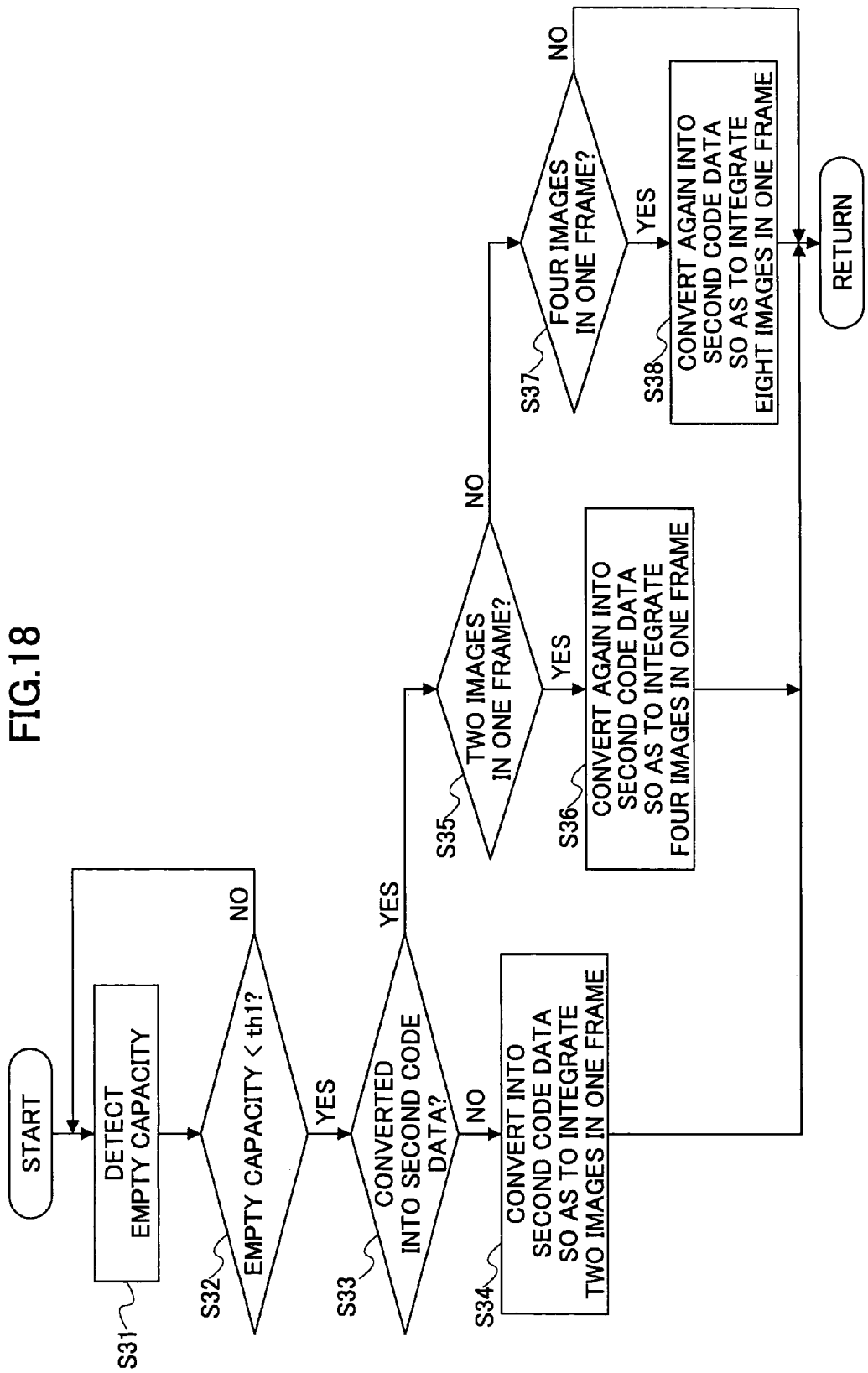
FIG. 18 is a flowchart for illustrating a process executed by the digital still camera according to an embodiment of the present invention.

In an embodiment of the present invention, different from a previously described embodiment, a process shown in FIG. 18 is conducted, instead of the process shown in FIG. 16. Processes of steps S31 through S34 in FIG. 18 are the same as the processes of steps S11 through S14 in FIG. 16. However, in step S34, the conversion of the first code data into the second code data b is conducted so as to integrate two static images of the first code data ai into one frame.

When the second code data b has been already converted (Y of step S33), it is determined whether current second code data b is the second code data that is converted so as to integrate two static images of the first code data ai into one frame (step S35). When it is determined that the current second code data b is converted so as to integrate two static images of the first code data ai into one frame (Y of step S35), with respect to the current second code data b, the conversion to the second code data b is conducted again so as to integrate four static images of original first code data ai into one frame (step S36).

When it is determined that current second code data b is not the second code data that is converted so as to integrated two static images of the first code data ai into one frame (N of step S35), it is determined whether the current second code data b is the second code data that is converted so as to integrate four static images of the first code data ai into one frame (step S37). When it is determined that the current second code data b is the second code data that is converted so as to integrate four static images of the first code data ai into one frame (Y of step S37), the conversion to the current second data b is conducted again so as to integrate eight static images of the original first code data ai into one frame (step S38). At a repeated conversion in steps S36 and S38, when a new static image is photographed and is still in the first code data, the new static image of the first code data ai is additionally provided to the second code data b and converted thereto.

Figure 19:
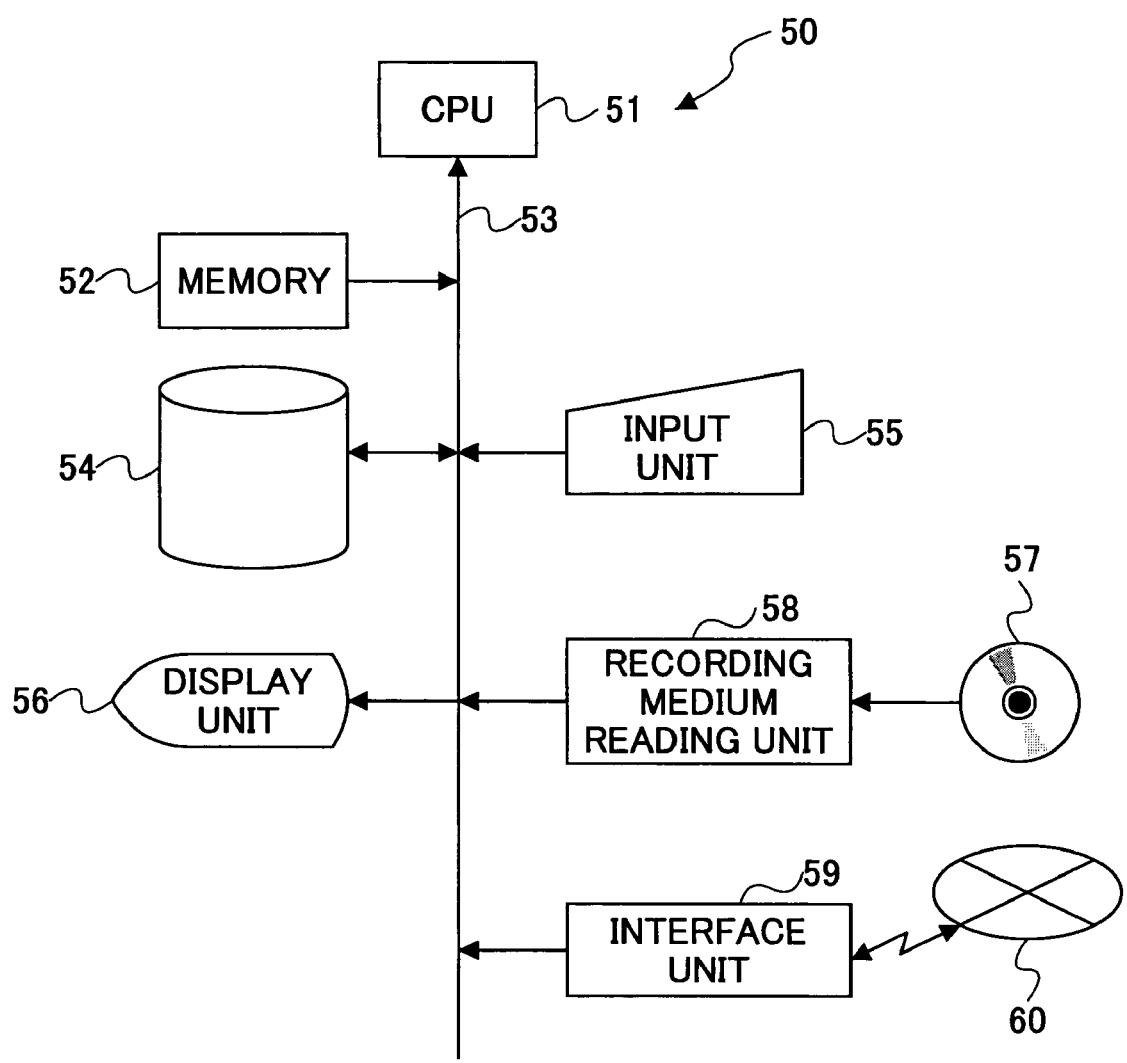
FIG. 19 is a block diagram illustrating electrical connections of an information processing apparatus according to one embodiment of the present invention.

FIG. 19 is a block diagram illustrating electrical connections of an information processing apparatus according to an embodiment of the present invention. As shown in FIG. 19, the information processing apparatus 50 realizes the image processing apparatus of the present invention. The information processing apparatus 50 is configured by a personal computer and includes a CPU 51 for intensively controlling each unit of the information processing apparatus 50 by conducting various operations, and a memory 52 including various ROMs and RAMs, which are mutually connected through a bus 53.

Through a predetermined interface, a magnetic storage unit 54 such as a hard disk, an input unit 55 configured by a mouse and a keyboard, a display unit 56 such as an LCD (Liquid Crystal Display) or a CRT (Cathode Ray Tube), a storage medium reading unit 58 for reading a recording medium 57 realizing a recording medium such as an optical disk according to the present invention, and a predetermined communication interface 59 for communicating through a network 60 are connected to the bus 53. As the recording medium 57, a medium based on various methods according to an optical disk such as a CD (Compact Disk) or a DVD (Digital Versatile Disk), a magnetic optical disk, and a flexible disk can be used. As a recording medium reading apparatus 58, in detail, an optical disk drive, a magneto-optical disk drive, and a flexible disk drive can be used corresponding to the type of the recording medium 57.

The magnetic storage unit 54 stores an image editing program realizing a program of the present invention. In general, the image editing program is read from the recording medium 57 realizing the recording medium of the present invention by the recording medium reading apparatus 58 and is installed in the information processing apparatus 50. Alternatively, the image editing program may be downloaded through the network 60 and installed in the information processing apparatus 50 or saved to the magnetic recording medium 54 to be installed in the information processing apparatus 50 later. The information processing apparatus 50 can be made operable by this installation. The image editing program may be a part of special application software. The image editing program may be operated on a predetermined OS (Operating System).

The CPU 51 conducts the process described above with reference to FIG. 8 through FIG. 18 based on the image editing program. In the camera 1 previously described, the compressing/decompressing circuit 15 compresses and decompresses the image, and the converting circuit 16 converts the first code data ai into the second code data b. However, in the information processing apparatus 50, the CPU 51 executes these processes based on the image editing program. The CPU 51, the display unit 56, the input unit 55, and the magnetic recording apparatus 54 of the information processing apparatus 50 correspond to the CPU 11, the display unit 17, the operation panel 18, and the image memory 14 of the camera 1, respectively. The memory 52 of the information processing apparatus 54 corresponds to the RAM 12 and the ROM 13 of the camera 1.

According to one embodiment of the present invention, it is possible to not only convert the static images into the motion image but also convert the motion image into the static images. Accordingly, it is not required to store code data of original static images after the conversion from the static images into the motion image. Therefore, it is possible to save capacity of the storage unit for storing the code data, and it is possible to control the empty capacity of the storage unit by converting the static images into the motion image.

According to one embodiment of the present invention, the static images compressed and encoded in accordance with the JPEG 2000 can be converted into the code data. Therefore, it is possible to sequentially display frames showing the static images in chronological order by using the code data after the conversion, and it is possible to easily search for a specific static image.

According to one embodiment of the present invention, the static images can be converted into the motion image. Therefore, it is possible to sequentially display the frames of the static images by using the code data after this conversion, and it is possible to easily search for the specific image.

According to one embodiment of the present invention, it is possible to convert the static images into the motion image in response to a request of the user.

According to one embodiment of the present invention, it is possible to control the empty capacity of the storage unit by converting the static images into the motion image when the empty capacity of the storage unit becomes smaller.

According to one embodiment of the present invention, it is possible to reduce the amount of code data by converting the static images into the motion image, and it is possible to control the empty capacity of the storage unit.

According to one embodiment of the present invention, it is possible to convert static images into the motion image by integrating the static images by the request of the user.

According to one embodiment of the present invention, the static images may be converted into the motion image when the empty capacity of the storage unit is smaller.

According to one embodiment of the present invention, it is possible to convert the static images into the motion image based on an integration degree requested by the user.

According to one embodiment of the present invention, it is possible to increase the degree of reducing the amount of code data by converting the static images into the motion image based on the empty capacity of the storage unit, so as to control the empty capacity of the storage unit.

According to one embodiment of the present invention, since the static images can be converted into the motion image with respect to only the specific area of the screen, it is possible to further reduce the amount of code data.

According to one embodiment of the present invention, since the static images can be converted into the motion image with respect to only the ROI, it is possible to further reduce the amount of code data.

According to one embodiment of the present invention, since the static images can be converted into the motion image with respect to only the specific area of the screen selected by the user, it is possible to further reduce the amount of code data.

According to one embodiment of the present invention, since the progressive order of the frames is identical, it is possible to display the motion image at higher speed.

According to one embodiment of the present invention, it is possible to allow the user to select a desired frame from a plurality of frames successively displayed at a display unit and to restore code data of the original static image.

According to one embodiment of the present invention, it is possible to successively display only the specific areas for a search.

The above advantages of embodiments of the present invention can be achieved by program code for causing a computer to conduct processes described above in the image processing apparatus or by a computer-readable recording medium recorded with the program code.

The present invention is not limited to the specifically disclosed embodiments, and variations and modifications may be made without departing from the scope of the present invention.

The present application is based on the Japanese Priority Patent Application No. 2002-349791 filed on Dec. 2, 2002, the entire contents of which are hereby incorporated by reference.

What is claimed is:

1. An image processing apparatus, comprising:
    an accepting unit to accept a request of an integration degree from a user;
    a setting unit to determine a number of static images to form each of frames based on the integration degree accepted by the accepting unit;
    a compressing unit to compress and encode image data of static images in accordance with a JPEG 2000 algorithm and generate first code data sets;
    a storing unit to store the first code data sets that are compressed by the compressing unit; and
    a code sequence converting unit to convert the first code data sets being stored by the storing unit into second code data in conformity with Motion JPEG 2000,
    wherein the code sequence converting unit comprises:
        a dividing unit to divide each of the first code data sets into a header portion and a code portion;
        a header processing unit to generate a new tile part header for a selected first code data set, and provide a tile index for each of tile part headers including the new tile part header; and a synthesizing unit to synthesize the selected first code data set to be the second code data in conformity with Motion JPEG 2000,
wherein the static images are integrated for each of the frames with the number of static images determined by the setting unit in the second code data.

2. The image processing apparatus as claimed in claim 1, wherein the synthesizing unit synthesizes the first code data sets into a single data sequence of the second code data where images aligning a plurality of static images are compressed and encoded.

3. The image processing apparatus as claimed in claim 1, further comprising:
a decompressing unit to decompress the first code data sets and the second code data; and
a displaying unit to display frames showing image data in chronological order at a display unit after the first code data sets and the second code data are decompressed.

4. The image processing of claim 1 further comprising:
an image pickup device to image the static images, wherein the compressing unit compresses and encodes image data generated from the image pickup device; and
a decompressing circuit to decompress and decode the code data of the first code data sets or the second code data.

5. An image processing method comprising:
accepting a request of an integration degree from a user;
determining a number of static images to form each of frames based on the integration degree accepted from the user; and
compressing and encoding image data of static images in accordance with a JPEG 2000 algorithm and generate first code data sets using an image processing apparatus;
storing the first code data sets that are compressed in a storage unit of the image processing apparatus;
converting the first code data sets being stored into second code data in conformity with Motion JPEG 2000,
wherein converting the first code data sets comprises:
dividing each of the first code data sets into a header portion and a code portion;
generating a new tile part header for a selected first code data set;
providing a tile index for each of tile part headers including the new tile part header; and
synthesizing data the selected first code data set to be the second code data in conformity with Motion JPEG 2000,
wherein the static images are integrated for each of the frames with the number of static images determined by the setting unit in the second code data.

6. The image processing method defined in claim 5, wherein synthesizing the first code data sets produces a single data sequence of the second code data where images aligning a plurality of static images are compressed and encoded.

7. The image processing method defined in claim 5 further comprising:
decompressing the first code data sets and the second code data; and
displaying frames showing image data in chronological order at a display unit after the first code data sets and second code data are decompressed.

8. The image processing method defined in claim 5 further comprising:
using an image pickup device to image the static images, wherein compressing and encoding the image data comprises compressing and encoding image data generated from the image pickup device; and
decompressing and decoding the code data of the first code data sets or the second code data.

9. An article of manufacture having one or more computer readable storage media storing instructions thereon which, when executed by a computer, cause the computer to perform an image processing method comprising:
accepting a request of an integration degree from a user;
determining a number of static images to form each of frames based on the integration degree accepted from the user;
compressing and encoding image data of static images in accordance with a JPEG 2000 algorithm and generating first code data sets;
storing the first code data sets that are compressed; and
converting the first code data sets being stored into second code data in conformity with Motion JPEG 2000,
wherein converting the first code data sets comprises:
dividing each of the first code data sets into a header portion and a code portion;
generating a new tile part header for a selected first code data set;
providing a tile index for each of tile part headers including the new tile part header; and
synthesizing the selected first code data set to be the second code data in conformity with Motion JPEG 2000,
wherein the static images are integrated for each of the frames with the number of static images determined by the setting unit in the second code data.

10. The article of manufacture defined in claim 9, wherein synthesizing the first code data sets produces a single data sequence of the second code data where images aligning a plurality of static images are compressed and encoded.

11. The article of manufacture defined in claim 9 wherein the method further comprises:
decompressing the first code data sets and the second code data; and
displaying frames showing image data in chronological order at a display unit after the first code data sets and the second code data are decompressed.

12. The article of manufacture defined in claim 9 wherein the method further comprises:
using an image pickup device to image the static images, wherein compressing and encoding the image data comprises compressing and encoding image data generated from the image pickup device; and
decompressing and decoding the code data of the first code data sets or the second code data.

* * * * *